United States Patent
Pramila et al.

(10) Patent No.: US 6,524,229 B2
(45) Date of Patent: Feb. 25, 2003

(54) COMPOSITE-CONSTRUCTION ROLL AND A METHOD FOR MANUFACTURING IT

(75) Inventors: Antti Pramila, Oulu (FI); Mauri Rukajärvi, Chonburi (TH); Tuomo Kurkela, Haukipudas (FI); Juha Isometsä, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/829,473

(22) Filed: Apr. 9, 2001

(65) Prior Publication Data

US 2001/0032924 A1 Oct. 25, 2001

(30) Foreign Application Priority Data

Apr. 13, 2000 (FI) .............................. 20000883

(51) Int. Cl.[7] ................................ B23P 15/00
(52) U.S. Cl. .................. 492/10; 492/9; 492/11
(58) Field of Search ................ 492/9, 10, 11; 250/227.14

(56) References Cited

U.S. PATENT DOCUMENTS

| | | | | |
|---|---|---|---|---|
| 5,592,875 A | | 1/1997 | Moschel | |
| 5,787,813 A | * | 8/1998 | Reising | 101/479 |
| 6,080,982 A | * | 6/2000 | Cohen | 250/227.11 |
| 6,261,487 B1 | * | 7/2001 | Bongaerts et al. | 264/175 |
| 6,299,571 B1 | * | 10/2001 | White et al. | 492/10 |
| 2001/0016546 A1 | * | 8/2001 | Haag | 492/11 |
| 2002/0016241 A1 | * | 2/2002 | VanRens | 492/9 |
| 2002/0063200 A1 | * | 5/2002 | Jones et al. | 250/227.14 |

* cited by examiner

Primary Examiner—Irene Cuda-Rosenbaum
(74) Attorney, Agent, or Firm—Fildes & Outland, P.C.

(57) ABSTRACT

A composite-construction roll, includes a roll frame reinforced with reinforcing fibers, and a method for manufacturing such a roll. There is at least one optical fibre among the reinforcing fibers and the roll includes terminals arranged in this optical fibre for a transmitter and a receiver for measuring a selected optical quantity from the fibre.

8 Claims, 1 Drawing Sheet

COMPOSITE-CONSTRUCTION ROLL AND A METHOD FOR MANUFACTURING IT

FIELD OF THE INVENTION

The present invention relates to a composite-construction roll, including a roll frame reinforced with reinforcing fibers, the reinforcing fibers are arranged in a spiral inside the matrix material. The invention also relates to a method for manufacturing a composite-construction roll and to a special use of the roll.

BACKGROUND OF THE INVENTION

European patent publication 363887 discloses one method for manufacturing a composite-construction roll. Generally, such a roll is manufactured on top of a suitable form by winding reinforcing fibers spirally around the form and simultaneously feeding the matrix material, usually a suitable resin. When manufacturing large rolls, the problem arises of not knowing the degree of hardening of the matrix material. This knowledge is important, because finishing that is started too early will damage the roll frame.

Other composite-construction rolls are disclosed in Finnish patent publications FI 94403 and FI 100264.

In roll manufacturing, there is a great need to understand the hardening event and to control manufacture more precisely. Uncontrolled hardening shrinkage distorts the shape of the roll and causes unnecessary residual stresses, which reduce the roll's service life. Controlled manufacture and subsequent monitoring of the roll are key factors in increasing reliability. In the case of composite rolls, information is needed from other parts of the roll as well as from the surface. This is especially so, as unlike in a metal structure, a composite roll's most critical point is not necessarily on its surface.

During operation, it is important to know the stresses acting in the roll, both to be able to monitor the roll's loading and for possible process control. PCT application publication WO 96/25288 discloses one system intended for monitoring nip loads, one embodiment of which uses optical fibers set into the surfacing to measure stress. Though such a sensor will certainly show the nip load, it will not show the stresses acting in the roll.

SUMMARY OF THE INVENTION

The present invention provides an entirely new kind of composite-construction roll and a method for manufacturing it, which will permit the manufacture of a better composite-construction roll and give advantages when using it.

More specifically, a composite-construction roll includes a roll frame reinforced with reinforcing fibers, characterized in that among the reinforcing fibers there is at least one optical fibre and that the roll includes terminals arranged in this optical fibre for a transmitter and a receiver for measuring a selected optical quantity from the fibre.

A method for manufacturing a composite roll, in which composite roll there is a roll frame and a possible surfacing and in which manufacturing of the roll frame the reinforcing fibers are fed simultaneously with the matrix material is characterized in that at least one optical fibre is fed among the reinforcing fibers.

The use of a composite roll in a paper/board or finishing machine, in which the roll drives or only supports the fabric, is characterized in that the measurement of the stress in the roll is used to measure the tension of the fabric.

Placing optical fibers among the reinforcing fibers will ensure that they become located inside the roll frame and will permit monitoring of internal events in the roll frame. Other benefits and embodiments of the invention appear in connection with the following examples.

These and other features and advantages of the invention will be more fully understood from the following detailed description of the invention taken together with the accompanying drawings.

DETAILED DESCRIPTION OF THE INVENTION

Figure 1:
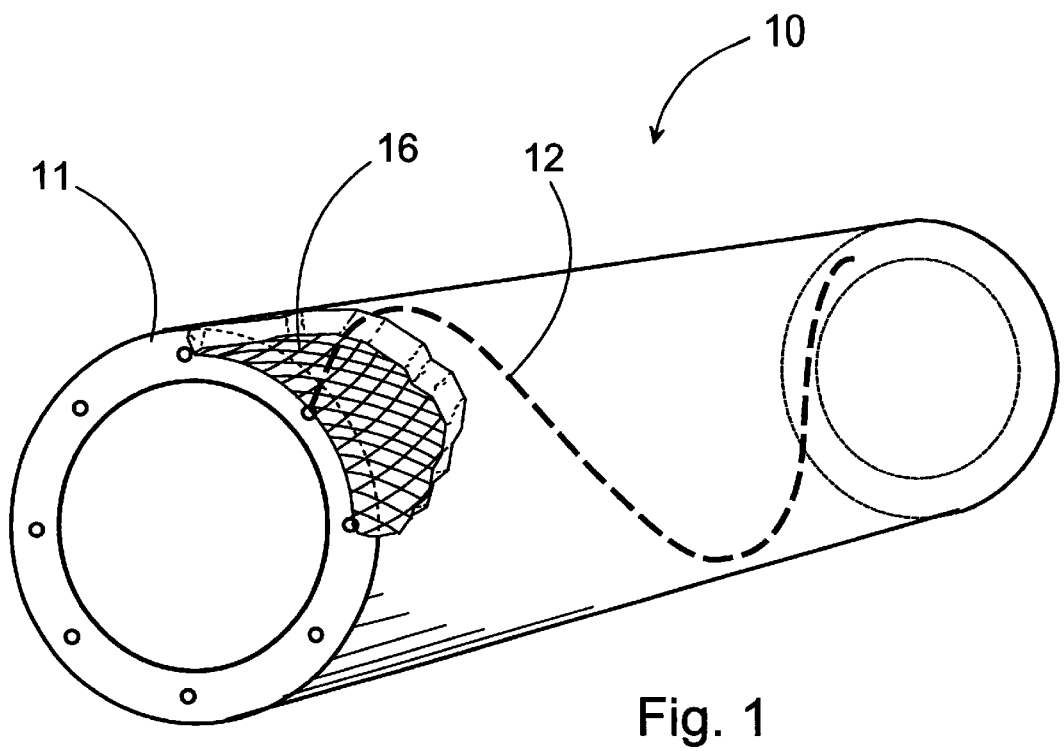
FIG. 1 shows a schematic view of a composite-construction roll together with an optical-fibre arrangement.

Referring now to the drawings in detail, numeral 10 generally indicates The roll frame 11 of the composite-construction roll is mainly manufactured in a known manner by winding reinforcing fibers 16 spirally on top of a suitable form and simultaneously feeding matrix material. The roll frame generally includes several fibre layers, in which the fibers are oriented differently, according to the desired properties. FIG. 1 shows schematically how the optical fibre fed along with the reinforcing fibre settles into place in the roll frame. In the figure, the optical fibre is placed so that its ends appear at the opposite ends of the roll frame 11, so that suitable terminals can be attached to them. If necessary, optical fibers can be placed in two or several layers in the roll frame.

Figure 2:
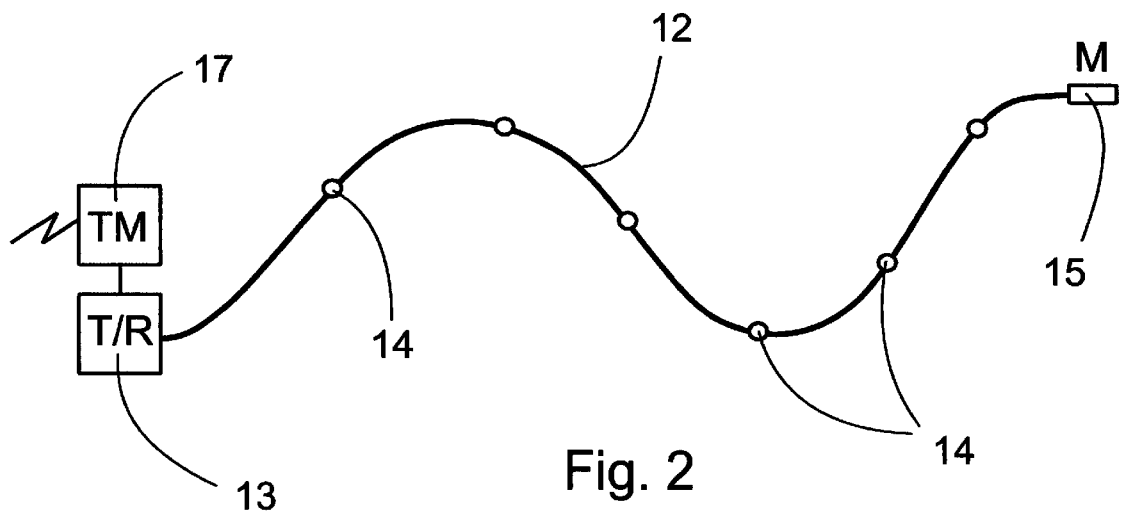
FIG. 2 shows the entire arrangement of optical fibers together with th e measuring terminals.

Measurement principles that can possibly be used in connection with the optical fibre are strain measurement in a long fibre using a strain gauge operating on the transit time principle, so-called EFPI (external Fabry-Perot interferometer) sensors, or Bragg's lattice sensors. A few of both Bragg's lattice and EFPI sensors can be installed in the same fibre, when a chain of point-like 'optical strain gauges' will be obtained. The strain measurement device can be used to measure either changes in length taking place over the entire sensor fibre or, if there are intermediate marks in the fibre, changes in the locations of these intermediate marks. FIG. 2 shows a diagram of the fibre of FIG. 1 detached from the roll frame and connected to measurement terminals. In this case, a lattice-structure fibre is used as the optical fibre 12, in which there are special reflector points 14 at regular intervals, which are sensitive to pressure. The transmitter and receiver 13 of the fibre are at one end and there is a mirror 15 at the other. The transceiver is connected to a telemetry instrument 17, which sends the measurement results to a base station. This allows the fibre to be installed in a rotating roll.

The measurement terminals attached at regular intervals can also be used to monitor the hardening of the matrix material during the manufacture of the roll. The measurement devices are preferably connected to the optical fibre 12 immediately after feeding the reinforcing fibers 16 and the matrix material, the equalization of the fibre being measured as a function of time, providing a basis from which to determine the degree of hardening of the matrix material and/or the aging of the roll frame 11.

It is possible to use a composite-construction roll according to the invention to measure thermodynamic state variables, such as deformation, temperature, moisture content, damage, etc. These quantities can then be used to estimate the service life and operating reliability of the roll.

The tension of the fabric carried by the roll can be estimated by measuring the stresses in the roll. The deflection of the roll causes stretching in the fabric, which can be measured in a manner that is, as such, known.

A roll according to the invention is eminently suitable for use in a paper/board/finishing machine, both in nip roll applications and in rolls without nips. Examples of applications include press rolls, such as the backing roll of a long-nip press, calendar rolls, coating equipment rolls, spreader an guide rolls, and rolls used in winders.

In one embodiment, at least part of the reinforcing fibre of the roll frame 11 is a continuous reinforcing fibre.

In one embodiment, the continuous reinforcing fibre 16 is arranged as one or several spiral layers around the roll frame 11.

In one embodiment, the orientation of the reinforcing fibre is different in adjacent layers.

In one embodiment, the optical fibre is arranged to measure the tension in the roll frame 11 at least one point in the roll. This can be further adapted to monitor or even measure the tension of the fabric driven by the roll.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A composite-construction roll including a roll frame reinforced with reinforcing fibers, characterized in that among the reinforcing fibers there is at least one optical fibre and that the roll includes terminals arranged in said optical fibre for a transmitter and a receiver for measuring a selected optical quantity from the fibre.

2. A roll according to claim 1, characterized in that at least some of the reinforcing fibers of the roll frame are continuous reinforcing fibers.

3. A roll according to claim 2, characterized in that the continuous reinforcing fibre is arranged as at least one spiral layer around the roll frame.

4. A roll according to claim 3, characterized in that the orientation of the reinforcing fibres is different in adjacent layers.

5. A roll according to claim 1, characterized in that at least two optical fibers are placed in different layers.

6. A roll according to claim 1, characterized in that the optical fibre has a so called lattice structure of special reflecting points formed at regular intervals.

7. A roll according to claim 1, characterized in that the roll includes a permanently installed transmitter and receiver and telemetry devices for the wireless transmission of the measurement data to a base station.

8. A roll according to claim 1, characterized in that the optical fibre is arranged to measure the stress in the roll frame at at least one point in the roll.

* * * * *